(12) United States Patent
Semersky

(10) Patent No.: US 6,910,390 B2
(45) Date of Patent: Jun. 28, 2005

(54) HAND HELD TORQUE METER

(75) Inventor: Frank E. Semersky, Toledo, OH (US)

(73) Assignee: Plastic Technologies, Inc., Holland, OH (US)

( * ) Notice: Subject to any disclaimer, the term of this patent is extended or adjusted under 35 U.S.C. 154(b) by 0 days.

(21) Appl. No.: 10/695,332

(22) Filed: Oct. 28, 2003

(65) Prior Publication Data

US 2004/0083821 A1 May 6, 2004

Related U.S. Application Data

(60) Provisional application No. 60/422,820, filed on Oct. 31, 2002.

(51) Int. Cl.$^7$ ................................................ B25B 23/14
(52) U.S. Cl. .................................................... 73/862.21
(58) Field of Search ........................ 73/862.21, 862.22, 73/862.23, 862.24

(56) References Cited

U.S. PATENT DOCUMENTS

| | | | |
|---|---|---|---|
| 3,678,744 A | | 7/1972 | Blattner |
| 3,813,933 A | | 6/1974 | Weiss et al. |
| 4,006,629 A | * | 2/1977 | Barrett et al. ............ 73/862.26 |
| 4,397,196 A | * | 8/1983 | Lemelson ................ 73/862.23 |
| 4,522,075 A | * | 6/1985 | Pohl ........................ 73/862.23 |
| 4,643,030 A | * | 2/1987 | Becker et al. ........... 73/862.23 |
| 4,665,756 A | * | 5/1987 | Snyder .................... 73/862.21 |
| 4,669,319 A | * | 6/1987 | Heyraud .................. 73/862.23 |
| 4,808,976 A | | 2/1989 | Kiefer et al. |
| 4,811,850 A | | 3/1989 | Bankuty et al. |
| 4,852,386 A | | 8/1989 | Grabovac et al. |
| 4,989,459 A | | 2/1991 | Faber, Jr. |
| 5,319,984 A | | 6/1994 | Humphries et al. |
| 6,796,190 B2 | * | 9/2004 | Curry ...................... 73/862.21 |

* cited by examiner

*Primary Examiner*—Max Noori
(74) *Attorney, Agent, or Firm*—Fraser Martin Buchanan Miller LLC; Donald R. Fraser

(57) ABSTRACT

The hand held torque meter is illustrated and described. The meter is capable of readily measuring the amount of torque required to loosen or apply a closure to the threaded finish of an associated container.

5 Claims, 4 Drawing Sheets

HAND HELD TORQUE METER

CROSS-REFERENCE TO RELATED APPLICATION

This application claims the benefit of U.S. provisional patent application Ser. No. 60/422,820, filed Oct. 31, 2002.

BACKGROUND OF THE INVENTION

1. Field of the Invention

The present invention relates to torque measuring meters and more particularly to a hand held meter for measuring the torque required to apply or remove a screw type closure from the threaded neck or finish of an associated container having a threaded finish.

2. Description of the Prior Art

In the manufacture of containers comprising combinations of screw-type closures with associated containers, it often becomes necessary or desirable to determine the degree to which the threaded closure complies with applicable torque specifications. For example, the torque with which a threaded closure is applied must be of a certain magnitude in order to properly seal the container so the closure does not become loose during shipment. Also, in the packaging of pharmaceutical products, since they can be toxic in the wrong dosages, dosage requirements are somewhat critical and it is often, either required or deemed desirable, to have a child-proof safety closure limiting access to the container contents. Such safety closures may, for example, comprise a threaded inner cap, for being threaded directly to the finish of a container, and an overlap loosely retractable relative to the inner cap. A user must push the outer cap axially onto the inner cap to engage a ratchet mechanism to be able to simultaneously turn the inner cap.

During the manufacture of products packaged in containers having threaded closures, the caps may be applied with a capping machine which must be adjusted from time to time to compensate for normal mechanical or component variations which may affect application torque. Normally, periodically control checks are conducted quarterly on the packages being produced. During a particular production run, an operator may periodically remove a completed sample product to determine the degree of torque required to remove the threaded closure from the associated container. A change of removal torque falling outside a predetermined range indicates the capping mechanism or other components of the manufacturing process must be adjusted or replaced.

There are known prior art devices and methods for affecting quality control torque tests of threaded closures to determine the amount of torque required to remove the closure from the threaded finish of the container. One of the standards of the industry is known as the Owens-Illinois Torque Meter manufactured by Secure Pak, Inc., Toledo, Ohio. There are also bench top torque measuring devices wherein the container is placed and squeezed to resist any rotational movement during the testing operation. The torque required to remove the associated closure is measured. To obtain the desired measurements, the containers must be transported to and from the torque measuring devices. The manner in which the torque is applied varies from one operator to another. Consequently, torque data produced by these operators is most likely to be non-uniform and non-reliable in comparison to industry standards.

It is a primary object of the present invention to produce a torque meter for determining the removal and/or application torque of a threaded closure on a container eliminating many of the operator induced errors associated with the use of manually operated meters.

SUMMARY OF THE INVENTION

The above object of the invention may be typically achieved by a hand held torque meter for sensing the torque required to axially move a threaded closure relative to the threaded neck of an associated container comprising a first section graspable by the hand of a user including means for displaying a torque measurement; a second section having means for grasping a removable closure of a container; and means connecting the first section to the second section, including a load cell having an output connected to the displaying means of the first section, whereby the force required to cause movement between a closure and the threaded neck of an associated container produces an output signal from the load cell to the torque displaying means of the first section indicating the torque required to effect a movement of the closure relative to the associated container.

BRIEF DESCRIPTION OF THE DRAWINGS

The above, as well as other objects and advantages of the invention will become readily apparent to one skilled in the art from reading the following detailed description of an embodiment of the invention when considered in the light of the attached drawings, in which.

DETAILED DESCRIPTION OF THE PREFERRED EMBODIMENT

Figure 2:
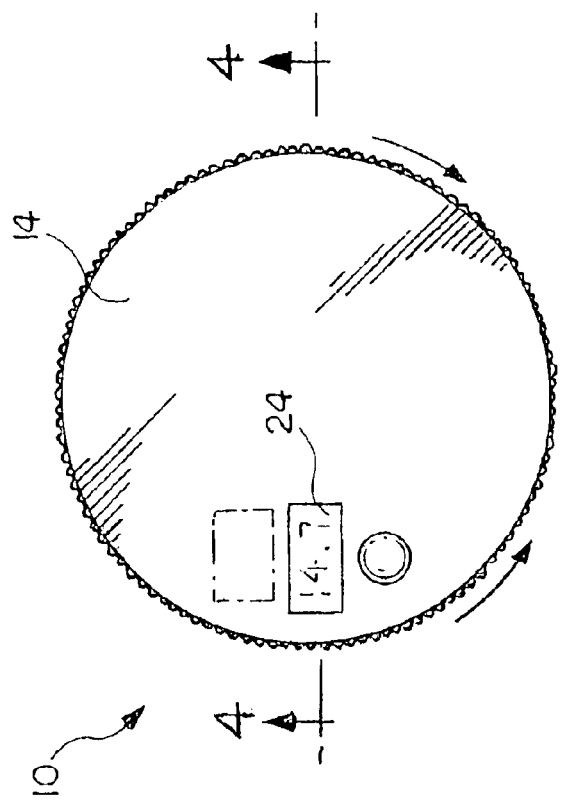
FIG. 2 is a top plan view of the meter illustrated in FIG. 1.
Figure 1:
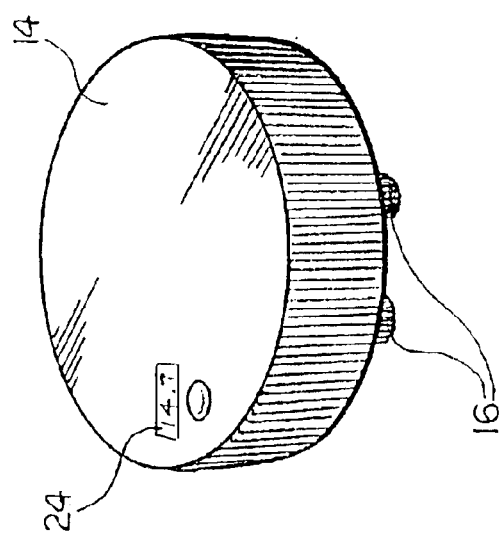
FIG. 1 is a perspective view of a hand held torque meter incorporating the features of the present invention.
Figure 4:
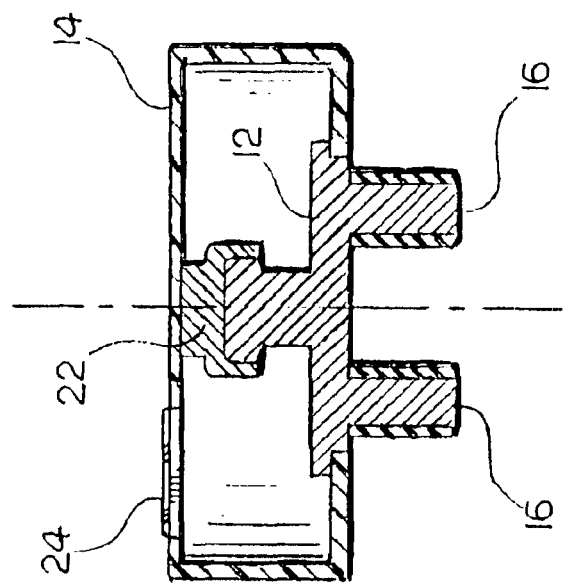
FIG. 4 is a cross-sectional view taken along line 4—4 of FIG. 2.
Figure 3:
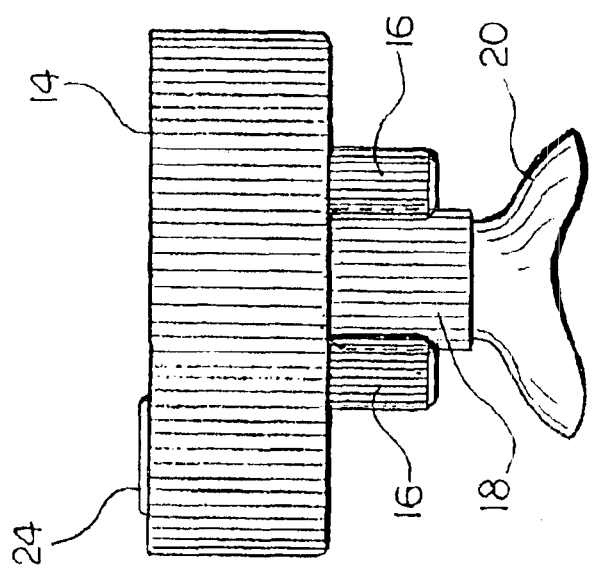
FIG. 3 is an elevational view of the meter illustrated in FIGS. 1 and 2.
Figure 6:
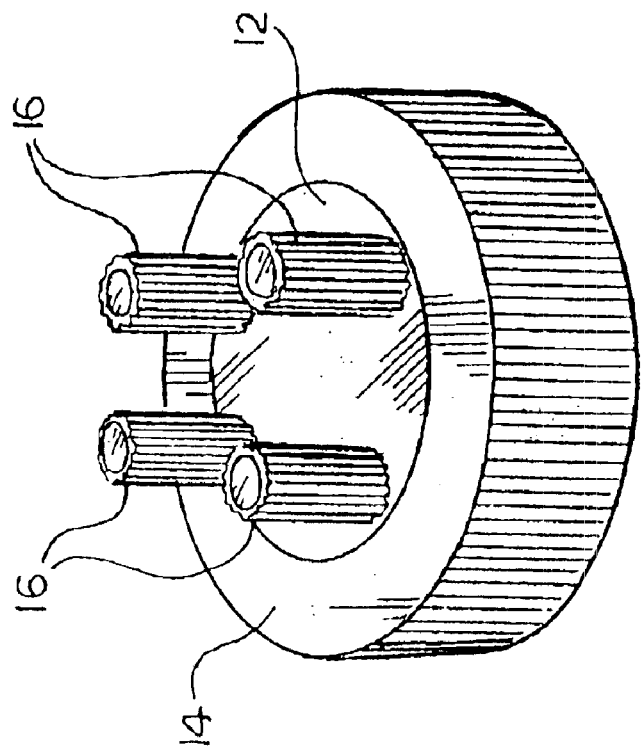
FIG. 6 is a bottom perspective view of the meter illustrated in FIG. 5.
Figure 5:
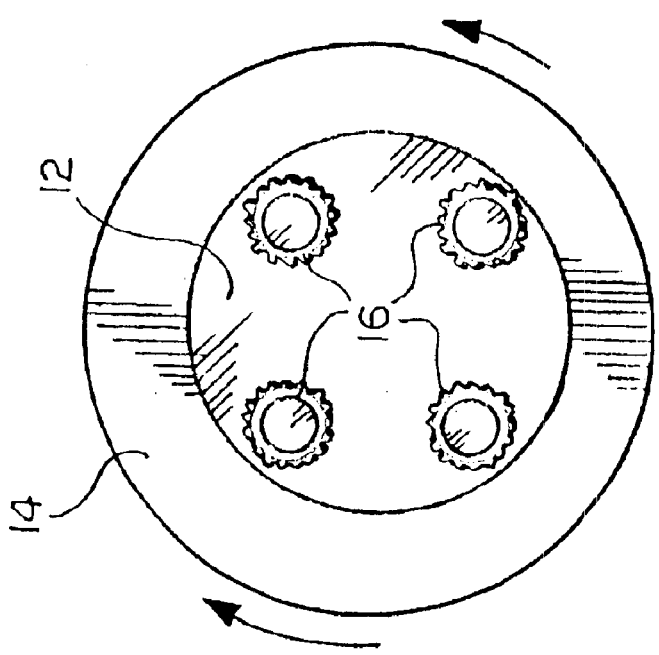
FIG. 5 is a bottom view of the meter illustrated in FIGS. 1, 2 and 3.

As illustrated in FIGS. 1 through 6, there is shown an improved hand held torque meter 10 for sensing and displaying the torque required to apply or remove a screw type closure cap from the threaded neck or finish of an associated container. The meter 10 is comprised of two separate sections. The lower inner section 12 of the meter 10 is connected to an upper section 14 in the form of an outer shell. The inner lower section 12 is designed to include a clamp or gripping structure having depending spaced apart fingers 16 adapted to clamp onto or conform to the closure 18 of a bottle 20, as illustrated in FIG. 3. The lower section 12 is connected to the upper outer section 14 through a load cell 22 or at least one strain gage. A coil spring or other torsional spring, a spring loaded moment arm, or strain gages such as disclosed in U.S. Pat. No. 4,669,319 to Heyraud can be used as the load cell 22, for example. It is understood that a direct readout device or a display 24 can be used without departing from the scope and spirit of the invention. The two sections of the meter jointly hold required electrical components including the digital display 24, if used, and a power supply, not shown. The electronic components convert the output signal of the load cell 22 into an appropriate measurement, which is consequently indicated on the display 24 preferably located in the upper section 14 of the meter 10.

It will be appreciated that the load cell 22 includes a beam element directly connected to the inner section 12. As the beam element of the load cell 22 is caused to be torqued about the central axis thereof, the torsional effect may be observed on the associated digital gage read out 24.

In operation, the torque meter 10 is positioned over a closure 18 of an associated bottle 20, the base of which may be securely clamped to prevent any rotational movement of the bottle 20. The closure 18 is secured in closed relation on the neck of the bottle 20. The downwardly depending fingers 16, each of which are typically provided with an encircling cylinder of an elastomeric material such as rubber, for example, are disposed about the outer circumference of the closure 18. The fingers 16 are caused to tightly engage the closure 18. Next, the operator turns the upper section 14 by grasping the serrated edge portion thereof and twists the upper section 14 thereby applying a torque to the lower section 12 through the load cell 22. The twisting movement of the upper section 14 is counter-clockwise, as illustrated in FIG. 2, tending to loosen the closure 18 from the threaded neck of the bottle 20. The digital gage 24 will register the amount of torque required to loosen the closure 18.

It will be obvious to those skilled in the art, that the reverse movement of the upper section 14 upon a closure 18 which is to be applied to the bottle 20 will determine the torque necessary to tighten the closure 18. This operation is accomplished by twisting the upper section 14 in a clockwise direction as illustrated in FIG. 2.

It will be understood that the clamping mechanism may include a mechanism for adjusting the clamping fingers 16 or may be fixed for predetermined or specific size closures. The fingers 16 typically include serrated surfaces to facilitate the grasping action.

Figure 7:
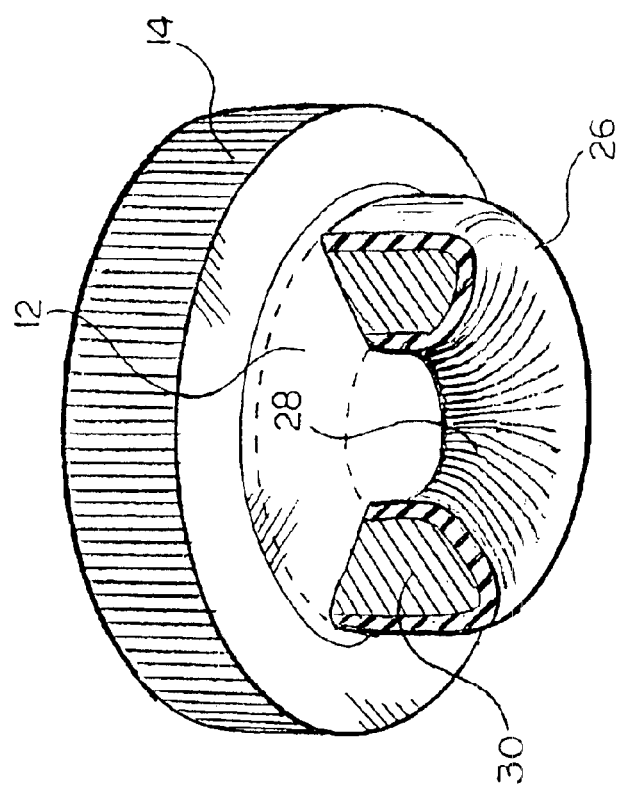
FIG. 7 is a partially broken away perspective view of an alternative closure gripping structure.

It must be appreciated that the grasping function achieved by the lower section 12 may be accomplished by different grasping structures. Typical amongst other structures which would be useful is the structural illustrated in FIG. 7. In FIG. 7, there is illustrated an apperturred gripping section 26 which is coupled to and caused to depend from the lower section 12' of the torque meter of the invention. The gripping section 26 includes a central aperture 28 which is generally frusto-conical in shape. The outer surface can be coated with a layer 30 of a suitable elastomeric material such as rubber, for example. The inwardly facing portion of the apertured center 28 is capable of gripping closures of varying diameters.

Figure 8:
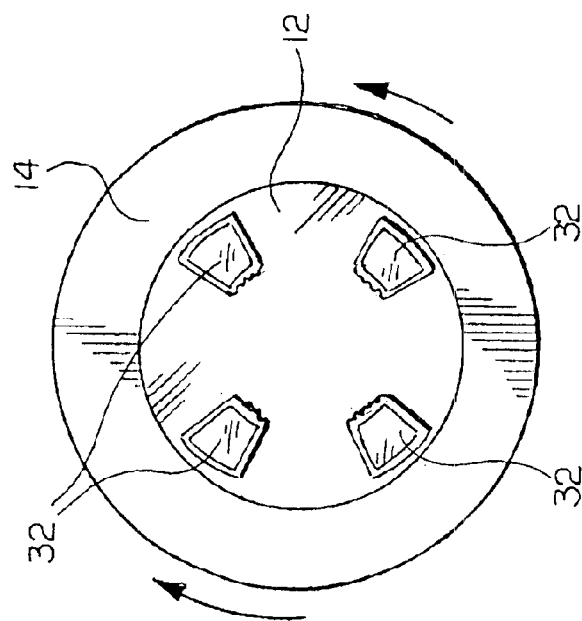
FIG. 8 is a bottom view of another embodiment of a closure gripping structure.

FIG. 8 shows another closure gripping arrangement wherein a plurality of fingers 32 depend from the lower section 12". The fingers 32 are provided with inwardly facing surfaces 34 capable of gripping the closure of a bottle for torque testing.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A hand held torque meter for sensing the torque required to axially move a threaded closure relative to the threaded neck of an associated container comprising:

a first section graspable by the hand of a user, including means for displaying a torque measurement;

a second section having a closure gripping device including a depending portion for gripping at least a portion of the outer peripheral surface of a threaded closure of an associated container; and means connecting said first section to said second section, said means including a load cell having an output connected to the displaying means of said first section, whereby the force required to cause movement between a closure and the threaded neck of an associated container produces an output signal from the load cell to the torque displaying means of said first section indicating the torque required to effect a movement of the closure relative to the threaded neck of an associated container.

2. A hand held torque meter as defined in claim 1 wherein the closure gripping device of said second section includes depending fingers for gripping the removable closure.

3. A hand held torque meter as defined in claim 1 wherein said fingers are spaced apart.

4. A hand held torque meter as defined in claim 3 wherein said fingers are provided with a elastomeric coating.

5. A hand held torque meter as defined in claim 1 wherein the closure gripping device of said second section includes a frusto-conical opening.

* * * * *